(12) United States Patent
Van de Velde et al.

(10) Patent No.: US 6,731,790 B1
(45) Date of Patent: May 4, 2004

(54) METHOD OF ENHANCING COLOR IMAGES

(75) Inventors: Koen Van de Velde, Duffel (BE); Paul Suetens, Bonheiden (BE)

(73) Assignee: Agfa-Gevaert, Mortsel (BE)

( * ) Notice: Subject to any disclaimer, the term of this patent is extended or adjusted under 35 U.S.C. 154(b) by 682 days.

(21) Appl. No.: 09/688,899

(22) Filed: Oct. 16, 2000

Related U.S. Application Data (60) Provisional application No. 60/163,417, filed on Nov. 3, 1999.

(30) Foreign Application Priority Data

Oct. 19, 1999 (EP) .............................. 99203430

(51) Int. Cl.[7] .............................. G06K 9/00; G06K 9/32
(52) U.S. Cl. ....................................... 382/162; 382/299
(58) Field of Search ................................. 382/162, 165, 382/254, 263, 260, 274, 275, 298, 299; 375/240.18; 358/443, 447

(56) References Cited

U.S. PATENT DOCUMENTS

| | | | | |
|---|---|---|---|---|
| 4,521,803 A | * | 6/1985 | Gittinger | 348/430.1 |
| 5,063,603 A | * | 11/1991 | Burt | 382/115 |
| 5,467,404 A | * | 11/1995 | Vuylsteke et al. | 382/274 |
| 5,526,446 A | * | 6/1996 | Adelson et al. | 382/275 |
| 5,737,456 A | * | 4/1998 | Carrington et al. | 382/299 |
| 5,828,792 A | * | 10/1998 | O'Gorman | 382/263 |
| 6,075,905 A | * | 6/2000 | Herman et al. | 382/284 |
| 6,173,084 B1 | * | 1/2001 | Aach et al. | 382/260 |
| 6,269,175 B1 | * | 7/2001 | Hanna et al. | 382/107 |
| 6,285,798 B1 | * | 9/2001 | Lee | 382/260 |
| 6,381,279 B1 | * | 4/2002 | Taubman | 375/240.18 |

FOREIGN PATENT DOCUMENTS

| | | |
|---|---|---|
| EP | 0 610 603 | 8/1994 |
| EP | 0 756 247 | 1/1997 |
| EP | 99 20 3430 | 2/2000 |

OTHER PUBLICATIONS

Anandakumar et al., "Nonlinear Filtering Using Generalized Subband Decomposition," Proceedings of the International Conference on Image Processing (ICIP), IEEE Comp. Soc. Press, 1995, pp. 382–385.

Jobson, D.J. et al., "A Multiscale Retinex for Bridging the Gap Between Color Images and the Human Observation of Scenes," IEEE Transactions on Image Processing, vol. 6, No. 7, Jul. 1, 1997, pp. 965–976.

Toet, A., "Multiscale Color Image Enhancement," Pattern Recognition Letters, vol. 13, No. 3, Mar. 1, 1992, pp. 167–174.

* cited by examiner

*Primary Examiner*—Andrew W. Johns
*Assistant Examiner*—Amir Alavi
(74) *Attorney, Agent, or Firm*—John A. Merecki; Hoffman, Warnick & D'Alessandro (57) ABSTRACT

A multi-resolution representation is generated of at least one color component of a color image in a selected color space by applying a decomposition procedure to the color component. The multi-resolution representation(s) is (are) modified by application of at least one non-linear modifying function. Next, modified color component images are generated by applying the inverse of the decomposition step to the modified multi-resolution representations(s).

16 Claims, 6 Drawing Sheets

METHOD OF ENHANCING COLOR IMAGES

This application claims benefit to provisional application No. 60/163,417 filed Nov. 3, 1999.

FIELD OF THE INVENTION

The present invention relates to a method of enhancing colour images.

BACKGROUND OF THE INVENTION

Digital radiographic images are acquired with a large dynamic range (usually 12 bits per pixel). Because the human visual system is not able to distinguish all the available grey level differences and because the image has to be brought back to 8 bits per pixel for printing and displaying, post-processing of the image is often necessary.

Multi-resolution image enhancement is being used routinely nowadays for processing of digital radiographs, i.e. for grey tone images. A multi-scale image enhancement method for radiographic images has for example been described in European patent 527 525 and European patent application 1 001 370.

An iterative processing method of the above-described kind has been described in European patent application 610 603.

As acquisition techniques improve for all kinds of images, the need for effective dynamic range compression still increases.

For colour photographic images, especially for those taken in outdoor scenes, one is very often confronted with a very wide dynamic range. When reproduced this often results in an image having areas that are too dark or too light.

Effective dynamic range compression without loss of important information is then required. As many different colours as possible have to be visualised.

Especially for photographic images it is furthermore unacceptable that the applied image processing wound result in an unnatural appearance of the processed colour image In the article 'Multiscale color image enhancement', by Toet A. in Pattern Recognition Letters, NL, North Holland Publ. Amsterdam, Vol. 13, No. 3, (Mar. 1, 1992), a multi-scale image decomposition method has been disclosed for application to color images.

In this method the luminance and saturation components of an image are first decomposed into contrast detail images of different spatial scales. The contrast is defined here as the ratio of the image or a low resolution version of the image and a successive lower resolution version of the image. Next, a new set of multi-scale luminance contrast primitives is then constructed by modulating the original luminance primitives at every location in the image and at every spatial scale by their corresponding saturation contrast primitives. Reconstruction of the color image from the resulting set of multiscale primitives provides a representation of the original image in which local luminance contrast is enhanced at all resolution levels.

OBJECTS OF THE INVENTION

It is an object of the present invention to provide a method for enhancing the image quality of colour images.

SUMMARY OF THE INVENTION

The above mentioned object is realised by an image processing method as described in claim 1. Specific features for preferred embodiments of the invention are disclosed in the dependent claims.

The method of the present invention is advantageous in that effective dynamic range compression can be obtained in combination with subtle feature enhancement.

The method of the present invention comprises the steps of decomposing at least one of the colour component images of a colour image into a multi-resolution image representation comprising bandpass detail images at multiple resolution levels and a residual image, modifying the multi-resolution image representation of at least one colour component image at at least one resolution level so as to obtain (a) modified multi-resolution image representation(s), reconstructing said colour component image(s) from the multi-resolution representation(s) by applying a reconstruction algorithm to the residual image and the modified and unmodified bandpass detail images of the respective colour component image(s), said reconstruction algorithm being such that if it were applied to the residual image and unmodified bandpass detail images of a colour component image, the colour component image or an approximation thereof would be obtained.

Preferably the modification is non-linear. At least one non-linear modifying function is applied to the detail image (s)

In a specific embodiment the multi-resolution image representation(s) is/are modified by multiplying the value of a detail image at pixel i and at resolution level j with a factor which is obtained by evaluating a non-linear modifying function in an argument value which depends on pixel values of detail images of said colour components at pixel i and resolution level j.

The multi-resolution image representation(s) is/are for example modified by multiplying the value of a detail image at pixel i and at resolution level j with a factor which is obtained by evaluating a non-linear modifying function in an argument value which depends on pixel values of detail images of said colour components at resolution level j and pixel i.

In one embodiment the multi-resolution representation comprises directional bandpass detail images. The multi-resolution representation is e.g. a multi-resolution gradient representation.

In a specific embodiment the argument of the modifying function is the norm of the colour gradient in a specific pixel and specified resolution level.

The modifying function may for example have the form set out in claim 8. It may depend on a pixel value in the vaginal image.

Further details on the modifying function are described further on.

The colour component images may be defined in a perceptual colour space such as the L, u, v colour space.

A gamut may be defined and the colour component images may be re-scaled to that defined gamut after reconstruction. The gamut may be the gamut of the original image.

The present invention as well as specific and/or preferred embodiments thereof will be explained in detail with reference to the accompanying drawings.

DETAILED DESCRIPTION OF THE INVENTION

The grey level of grey-level images is commonly represented by a single number. Pixels of colour images however are commonly specified by three numbers. These numbers represent coordinates of each pixel relative to coordinate axes in a specific colour space.

In the following the ensemble of the coordinates referring to a specific axis for all pixels of a colour image will be referred to as 'colour component'. A single colour component of a colour image can be seen as a grey-valued image.

In a so-called R(red) G(green) B(blue) colour space, a colour is specified by the amounts of red (R), green (G) and blue (B) primary colour present in the composite colour of each pixel. This representation is much used because of its compatibility with additive colour reproduction systems.

In more perceptual colour spaces, such as HSV, Lab, Luv, colour is represented by a brightness component (V=value in HSV and L=lightness in Lab, Luv) and two other additional components which encode the chromaticity (e.g. hue, represented by 'H', and saturation represented by 'S' in the HSV colour space).

More detailed information on colour spaces and colour representations can be found in the following references: Pratt W. K., Digital Image Processing, Wiley, New York, (1991) and Wyseszcki G., Stiles W. S., Color Science: concepts and methods, quantitative data and formulae, Wiley, New York (1982).

For enhancement purposes an RGB image representation is preferably converted to its coordinates in a perceptual colour space. This is preferred since it is the objective to modify perceptual colour differences which is easier when a perceptual representation is used.

Lab and Luv are considered to be more perceptually uniform than HSV (i.e. numerical differences correspond better to perceptual ones), and therefore they are superior for the purpose of this invention.

The HSV colour space is advantageous because of its simplicity and the fact that in this colour space chromaticity is split into hue and saturation.

This splitting can however also be realised by using polar coordinates in the ab-plane in the Lab colour space or in the uv-plane when the Luv colour space is used.

Figure 1:
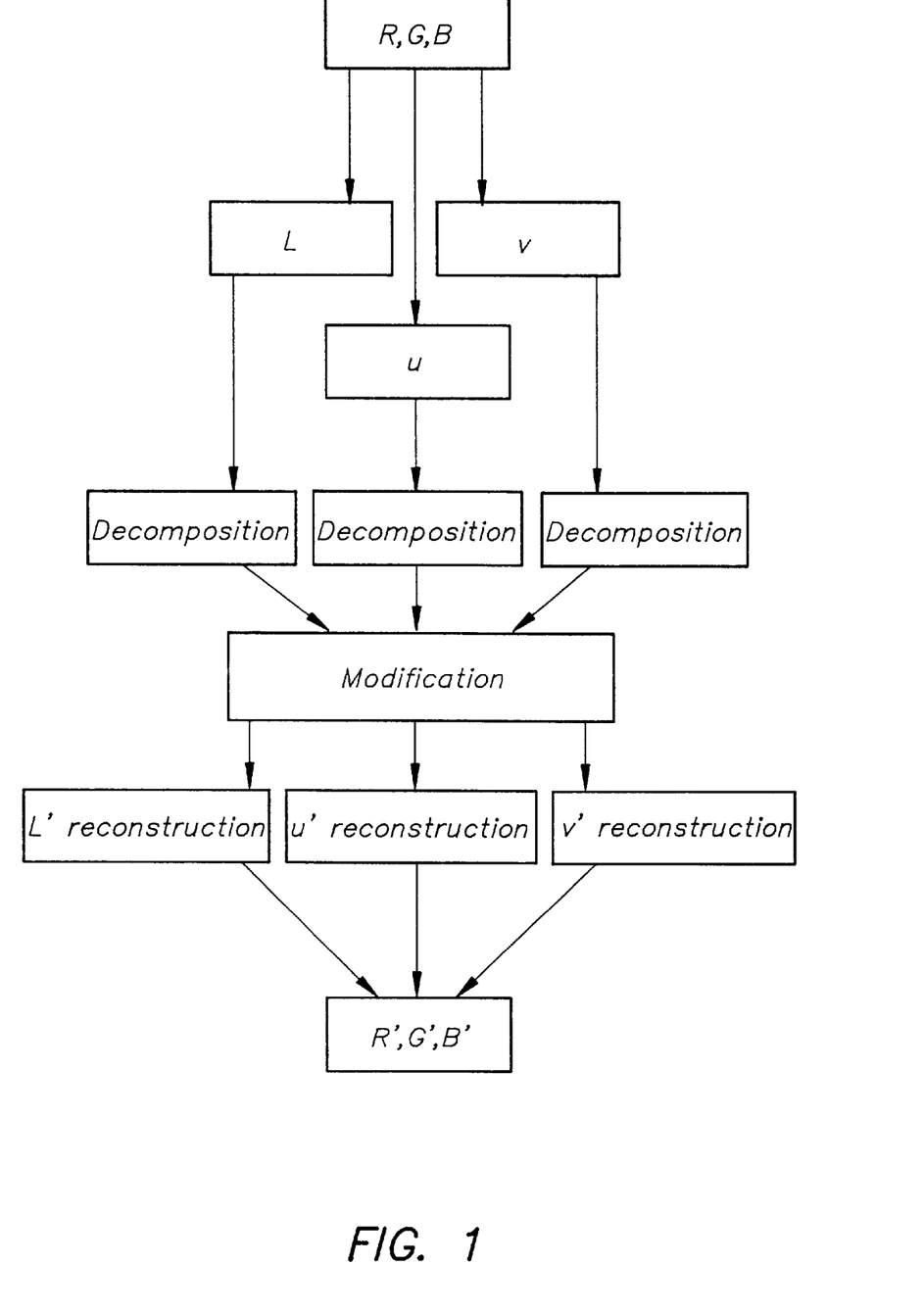
FIG. 1 illustrates in general the sequence of image decomposition, modification and reconstruction according to the method of the present invention.

FIG. 1 illustrates the general concept of the present invention.

A colour image to be processed is represented by a set of primary colour component images for example R, G, B component images.

In a first step, which is optional, the representations of the colour components of an image are transformed into a corresponding representation in a conceptual colour space such as the Luv colour space.

In this example it was assumed that the colour image was originally furnished as an R, G, B image. The R, G, B image representation is then converted into a Luv image.

Next, at least one of the L, u, v component images, or further on called L, u and v colour planes, is decomposed into a multi-resolution representation (also called multi-scale representation) comprising a set of bandpass detail images at different resolution levels and a residual image.

The detail images each represent the details present in the image at a certain resolution level. The details of an image at resolution level j can be interpreted as the difference of information between its approximation at a resolution level j and its approximation at a lower resolution level j+1.

The detail images contain the image details at a resolution level j. Each resolution level corresponds with a spatial frequency band and the detail images at a resolution level contain the image detail in the frequency band corresponding with that resolution level, i.e. all detail images are band-pass images.

In the described embodiment the multi-resolution image representation is a multi-scale gradient representation as will be explained furtheron. The image decomposition comprises a set of detail images each consisting of a horizontal and a vertical gradient component. The image gradient captures the local variations of the image. It is computed by convolving the image with two directional high pass filters. The simplest implementation makes use of a two-element filter g=(1,−1) for the horizontal direction and its transpose for the vertical direction.

It will be clear that other kinds of multi-resolution representations may be used such as Laplacian (pyramid) representations.

In the next step the multi-resolution representation of at least one component of the image in the selected colour space is modified. For this purpose the multi-resolution representation of this colour component image is pixel-wise subjected to a modification according to at least one modifying function.

The modifying function may be identical for all resolution levels of the multi-resolution representation. Alternatively it may differ between resolution levels of the same multi-resolution representation.

Likewise it is not required to use the same modification function or the same set of modification functions for application to the multi-resolution representations of each of the colour component images in the selected colour space.

FIG. 1 illustrates a specific example wherein a modification is applied to each of the image components L, u and v. This is however not necesary. It is also possible that only a single component, for example the L component of the image, is modified while the other colour component images remain unaltered or visa versa.

It is advantageous that at the finest levels of the multi-resolution representations only the elements of the multi-resolution representation of the L colour component image are modified, while the finest resolution levels of the u and v colour component images are left unaltered. In this way the additional generation or boosting of colour noise is avoided.

The modification function is a non-linear function which provides that details of small amplitude are enlarged at the expense of the ones with larger amplitude.

As a result of this modification a set of modified detail images is obtained for each of the colour component images to which modification has been applied.

In the fourth step the modified multi-resolution representation of each of the colour component images is subjected to a reconstruction processing so as to obtain modified colour component images L', u', v'.

If desired, the reconstructed perceptual colour space components may be transformed again into R, G, B components.

Figure 2:
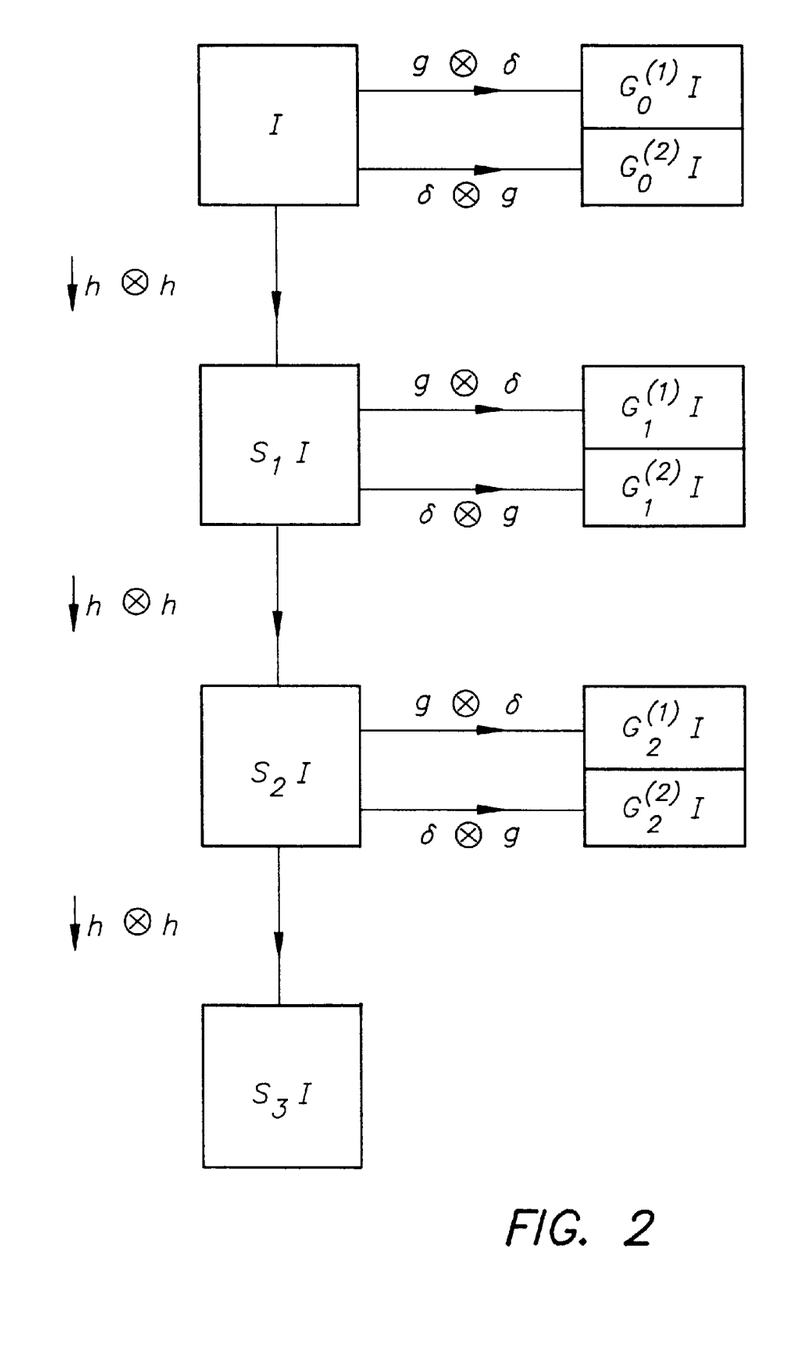
FIG. 2 illustrates the decomposition—with subsampling—of an image into a sequence of detail images at different resolution levels.

The following is a detailed description of the different steps of the present invention. The first step is illustrated in FIG. 2. This step consists of the decomposition of a colour component image into a corresponding multi-scale gradient representation whereby detail is represented by the discrete gradient in horizontal and vertical direction.

The following explanation is given for one of the colour components of the colour image, for example for the 'L'-component. It is however to be understood that in this embodiment a similar procedure is applied to the other colour component images of the colour image in the selected colour space, so also for the u and v component in this described specific embodiment.

A colour component image is in the following indicated by the denomination I. I thus for example represents the L-component of the colour image representation in the Luv colour space. The colour image component is a map from a grid of pixels $P \subset Z^1$ to R.

The decomposition of an image into detail images at successively coarser scale is illustrated in FIG. 2.

The decomposition comprises first the generation of approximation images of the original image at successively coarser scale. Looking at the image at a coarser scale is formulated mathematically by smoothing and subsampling of the image.

More specifically, a one-dimensional low-pass filter h is first selected, e.g. h=$\frac{1}{16}$(1,4,$\underline{6}$,4,1) (underlined element is the zeroth element).

This one-dimensional low-pass filter is used to construct a two-dimensional low-pass filter h$\otimes$h This filter acts on the image by convolving it with h in the horizontal direction and then in the vertical direction.

Next a set of approximation images $S_j I$ of the image I at scales j,$0 \leq j \leq K$ are generated. An approximation image $S_j I$ at scale j whereby $0 \leq j \leq K$, of the image I is defined recursively by the following formulae $S_0 I = I$ $S_j I = \downarrow (h \otimes h) * S_{j-1} I$  (1)

Here $\downarrow$ denotes subsampling of the image by a factor of 2 in the horizontal and vertical directions, keeping only pixels (2x,2y) for (x,y) in the original image lattice.

The discrete gradient $\vec{G}_j I$ of each approximation image is then calculated by applying the formula $\vec{G}_j I = ((g \otimes \delta) * S_j I, (\delta \otimes g) * S_j I)$  (2)

where g is a gradient filter (e.g. g=($\underline{\frac{1}{2}}$, $-\frac{1}{2}$) and $\delta$ is the Kronecker delta or unity filter.

$(g \otimes \delta)$ convolves with g in the horizontal direction and $(\delta \otimes g)$ convolves with g in the vertical direction.

The set $\{\vec{G}_0 I, \vec{G}_1 I, \ldots \vec{G}_n I, S_K I\}$ is called the multiscale gradient representation of I.

In the described specific embodiment a two-dimensional gradient representation has been selected for describing the image detail present in an image at multiple resolution levels.

Other representations could also have been used instead of the gradient representation, such as a Laplacian representation.

A representation can only be useful for the problem of image enhancement if the decomposition process is reversible, i.e. if one is able to reconstruct the image from its decomposed representation. In other words, it is necessary that the invers transform of the decomposition transform exists.

Figure 3:
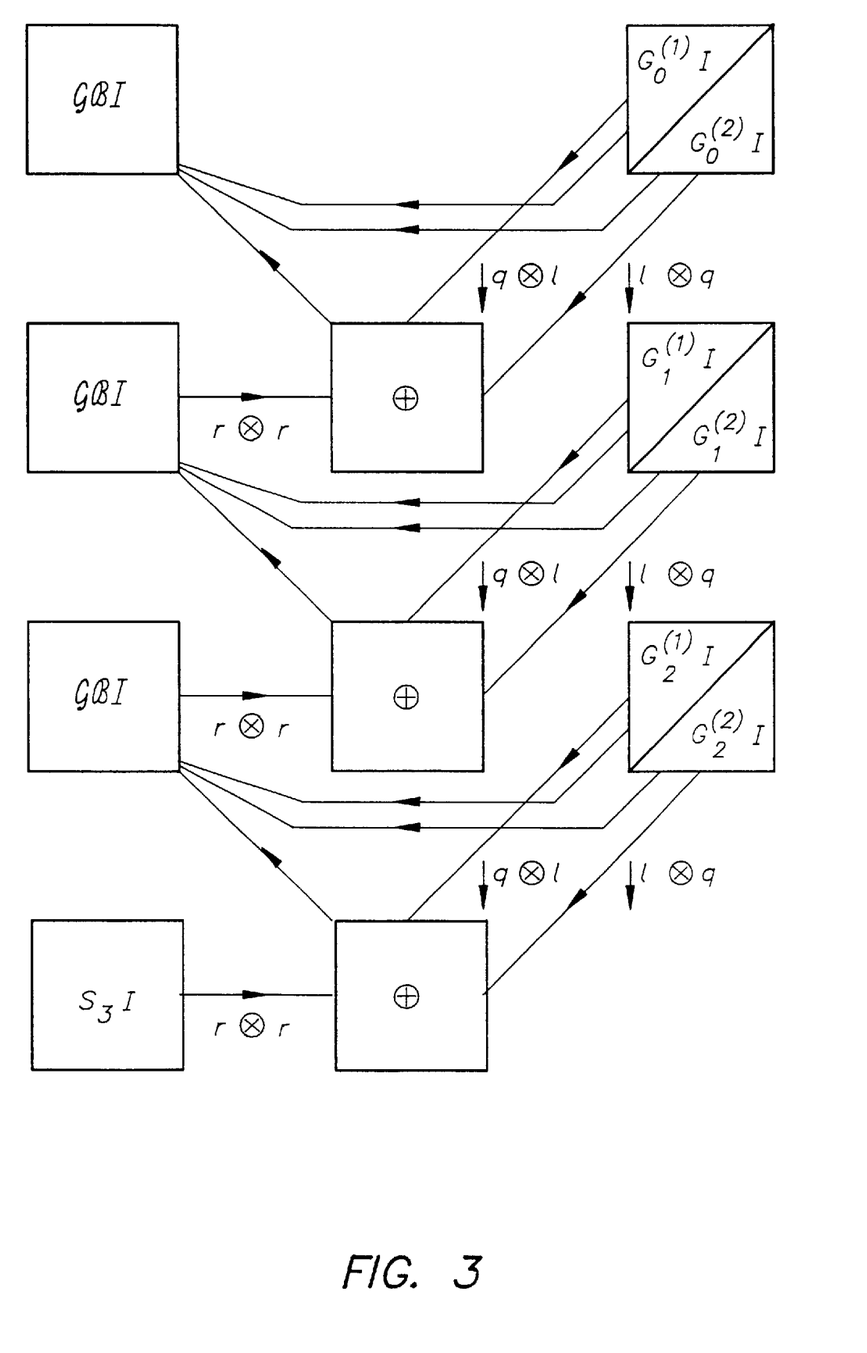
FIG. 3 illustrates the reconstruction of an image from modified detail images obtained by a decomposition according to the method which was illustrated in FIG. 2 and subsequently modified.

The reconstruction is illustrated in FIG. 3.

To fulfill this requirement, the following constraints must be satisfied: two additional filters p, q must exist such that $p*h + q*g = \delta$  (3)

the odd elements of p are zero

This last property guarantees that there exists another filter r such that for any image I $\downarrow (p \otimes p) * I = (r \otimes r) * (\downarrow I)$  (4)

Relation (3) can be extended to two dimensions as (5)

$\delta \otimes \delta = (p*h + q*g) \otimes (p*h + q*g)$ $= (p*h) \otimes (p*h) + (q*g) \otimes (p*h) + (p*h) \otimes (q*g) + (q*g) \otimes (q*g)$ $= (p*h) \otimes (p*h) + (q*g) \otimes \left(p*h + \frac{1}{2}q*g\right) + \left(p*h + \frac{1}{2}q*g\right) \otimes (q*g)$ $= (p*h) \otimes (p*h) + (q*g) \otimes \left(\frac{\delta + p*h}{2}\right) + \left(\frac{\delta + p*h}{2}\right) \otimes (q*g)$ $= (p*h) \otimes (p*h) + (q*g) \otimes l + l \otimes (q*g)$ $= (p \otimes p) * (h \otimes h) + (q \otimes l) * (q \otimes \delta) + (l \otimes q) * (\delta \otimes g)$ where the filter l is defined by the relation $l = \left(\frac{\delta + p*h}{2}\right)$ and therefore (using (5) and (4)):

$\downarrow S_j I = \downarrow (p \otimes p) * (h \otimes h) * S_j I + \downarrow (q \otimes l) * (q \otimes \delta) * S_j I * \downarrow (l \otimes q) * (\delta \otimes g) * S_j I$  (6)

$= (r \otimes r) * \downarrow (h \otimes h) * S_j I + \downarrow (q \otimes l) * (g \otimes \delta) * S_j I + \downarrow (l \otimes q) * (\delta \otimes g) * S_j I$ $= (r \otimes r) * S_{j+1} I + \downarrow (q \otimes l) * G_j^{(h)} I + \downarrow (l \otimes q) * G_j^{(v)} I$ The superscripts (h) and (v) refer to the horizontal and vertical components of the gradient.

This last equation expresses that a subsampled version $\downarrow S_j I$ of the approximation image $S_j I$ can be recovered from the coarser approximation image $S_{j+1} I$ and the gradient $\vec{G}_j I$ of $S_j I$.

To find the full approximation image $S_j I$ from its subsampled version the gradient can be used again to do an exact interpolation: for a pixel (2x+1,2y) lying in the middle of the two sample pixels (2x,2y) and (2x+2,2y) we have that $$S_jI(2x+1,2y)=\frac{1}{2}[S_jI(2x,2y)-2G_j^{(h)}I(2x,2y)+S_jI(2x+2,2y)+2G_j^{(h)}I(2x+1,2y)] \quad (7)$$

For a pixel (2x,2y+1) lying in the middle of the two sample pixels (2x,2y) and (2x,2y+2) we have that $$S_jI(2x,2y+1)=\frac{1}{2}[S_jI(2x,2y)-2G_j^{(v)}I(2x,2y)+S_jI(2x,2y+2)+2G_j^{(v)}I(2x,2y+1)] \quad (8)$$

For a pixel (2x+1,2y+1) lying in the middle of the four sample pixels (2x,2y), (2x+2,2y), (2x+2,2y), (2x,2y+2) and (2x+2,2y+2) we then have $$S_jI(2x+1,2y+1)=\frac{1}{4}$$

$$[S_jI(2x+1,2y)-2G_j^{(v)}I$$

$$(2x+1,2y)+S_jI$$

$$(2x,2y+1)-2G_j^{(h)}I$$

$$(2x,2y+1)+S_jI$$

$$(2x+1,2y+2)+2G_j^{(v)}I$$

$$(2x+1,2y+1)+S_jI$$

$$(2x+2,2y+1)+2G_j^{(h)}I$$

$$(2x+1,2y+1)] \quad (9)$$

The above described procedure (see equations (7), (8) and (9)) is called gradient based interpolation (GBI).

Therefore an image can be reconstructed from its multi-scale gradient representation by recursively applying equations (6) through (9) for j=K−1 down to 0. (see FIG. 3)

Figure 4:
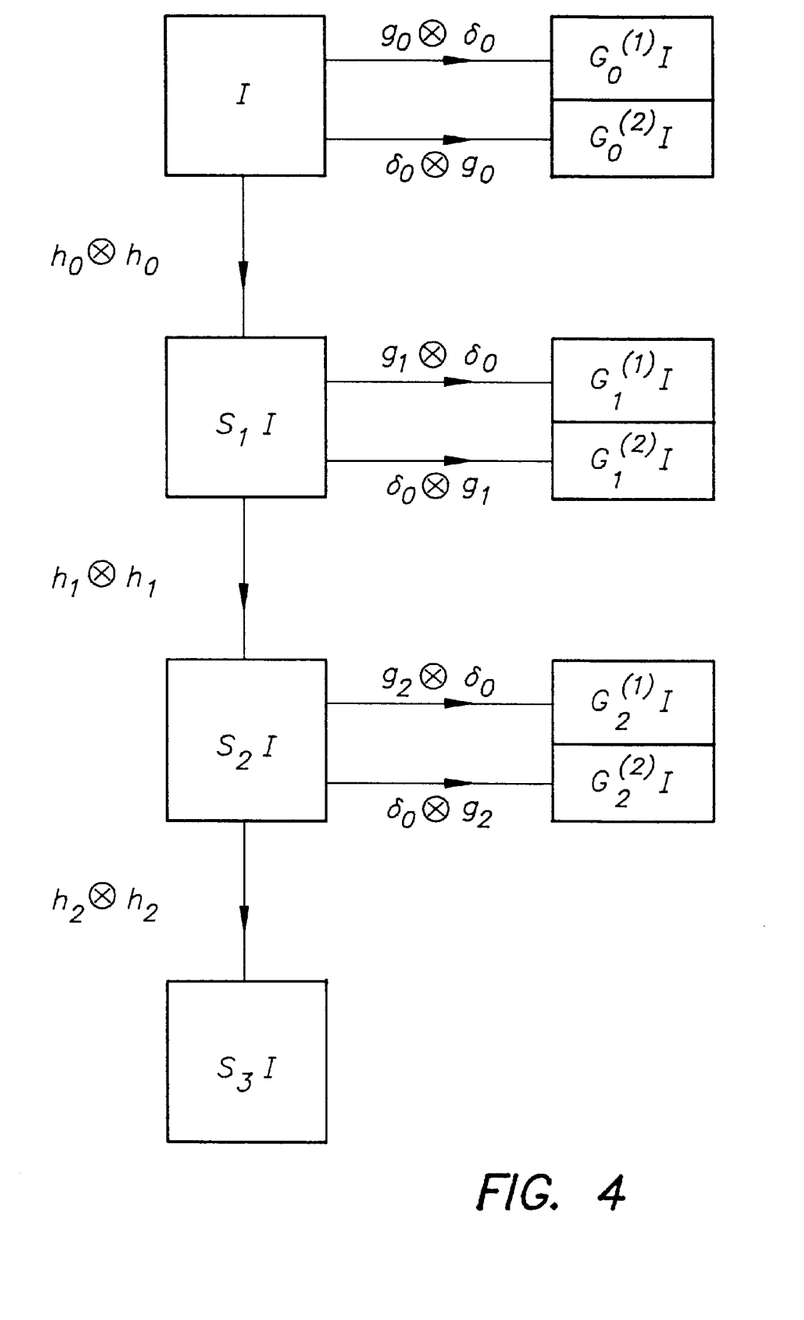
FIG. 4 illustrates the decomposition—without subsampling—of an image into a sequence of detail images at different resolution levels.

This representation can also be implemented without subsampling if, instead of subsampling the approximation image, the filters are stretched by inserting zeros between any two elements and centered:

define $$h_0 = \frac{1}{16}(1, 4, \underline{6}, 4, 1) \qquad g_0 = \frac{1}{2}(\underline{1}, -1)$$

$$h_1 = \frac{1}{16}(1, 0, 4, 0, \underline{6}, 0, 4, 0, 1) \qquad g_1 = \frac{1}{2}(1, \underline{0}, -1)$$

$$h_2 =$$

$$\frac{1}{16}(1, 0, 0, 0, 4, 0, 0, 0, \underline{6}, 0, 0, 0, 4, 0, 0, 0, 1) \quad g_2 = \frac{1}{2}(1, 0, \underline{0}, 0, -1)$$

Figure 5:
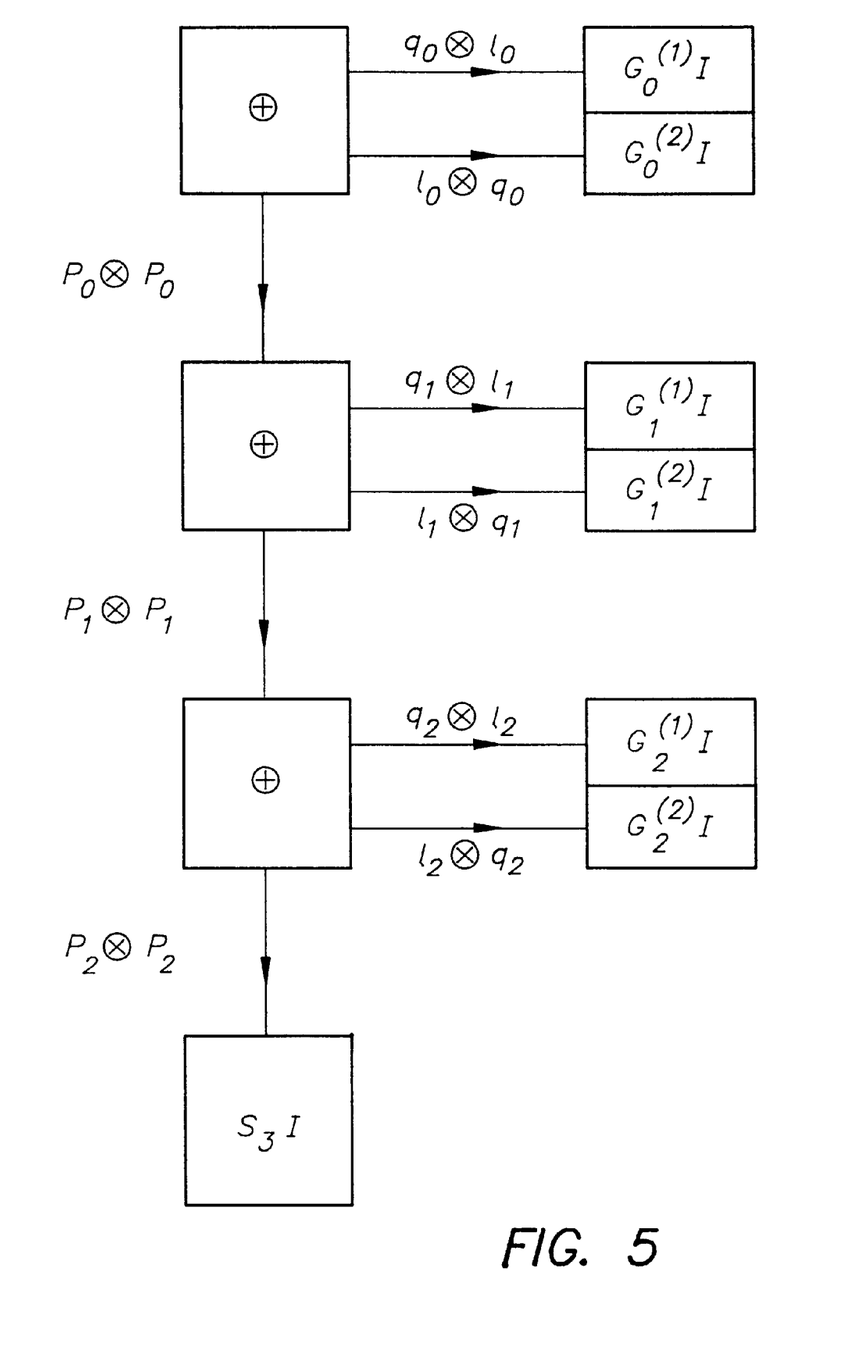
FIG. 5 illustrates the reconstruction of an image which was decomposed according to the method illustrated in FIG. 4 and subsequently modified.

The same definitions can be made for $q_j,p_j,l_j, 0 \leq j \geq K$. The implementation without subsampling is organized as follows (see FIG. 4):

$$S_0I=I$$

$$S_jI=(h_{j-1} \otimes h_{j-1})*S_{j-1}I$$

$$\vec{G}_jI=((g_j \otimes \delta)*S_jI,(\delta \otimes g_j)*S_jI)$$

$$S_jI=(p_j \otimes p_j)*S_{j+1}I+(q_j \otimes l_j)*G_j^{(h)}I+(l_j \otimes q_j)*G_j^{(v)}I \quad (10)$$

To enhance the contrast in the image the multi-resolution image representation is modified in such a way that details of small amplitude are enlarged at the expense of the ones with larger amplitude. In this embodiment this modification is performed uniformly over all scales.

For this purpose the original transform coefficients resulting from the image decomposition are mapped in a continuous, monotonous non-linear way into modified coefficients.

While the colour components are each decomposed separately into their multi-resolution representation, it is preferable to perform the modification in a coupled way, i.e. to use information about all three colour components for the modification of an individual colour component.

For each colour component I the gradient $(G_j^{(h)}I, G^{(v)}I)$ at modification level j has been computed.

Since the three components L, u, v make up the resulting colours, it makes sense to defined the colour gradient at resolution level j and pixel i as the sextet $$(G_j^{(h)}L(i), G_j^{(v)}L(i), G_j^{(h)}u(i), G_j^{(v)}u(i), G_j^{(h)}v(i), G_j^{(v)}v(i))$$

In the Luv colour space distances between colours can be described by the Euclidean distance.

The distance between two colors C1 represented by the triplet (L1, u1, v1) and C2 represented by the triplet (L2, u2, v2) is given by $$\Delta=((L_1-L_2)^2+(u_1-u_2)^2+(v_1-v_2)^2)^{1/2}$$

The norm of the colour gradient at a resolution level j and pixel i is therefore $$\Gamma_j(i)=(\|\vec{G}_jL(i)\|^2+\|\vec{G}_jv(i)\|^2)^{1/2}\|\vec{G}_jI(i)\|=((G_j^{(h)}I(i))^2+(G_j^{(v)}I(i))^2)^{1/2}$$

If only the colour gradient norm is changed and the direction is left unaltered, unwanted colour shifts as well as spatial deformations in the reconstructed colour image can be avoided.

This results in the following method for modifying the multi-scale representation of a colour image.

$$\vec{G}'_{Lj}(i)=\vec{G}_jL(i)\cdot y(\Gamma_j(i))$$

$$\vec{G}'_{uj}(i)=\vec{G}_ju(i)\cdot y(\Gamma_j(i))$$

$$\vec{G}'_{vj}(i)=\vec{G}_jv(i)\cdot y(\Gamma_j(i))$$

Figure 6:
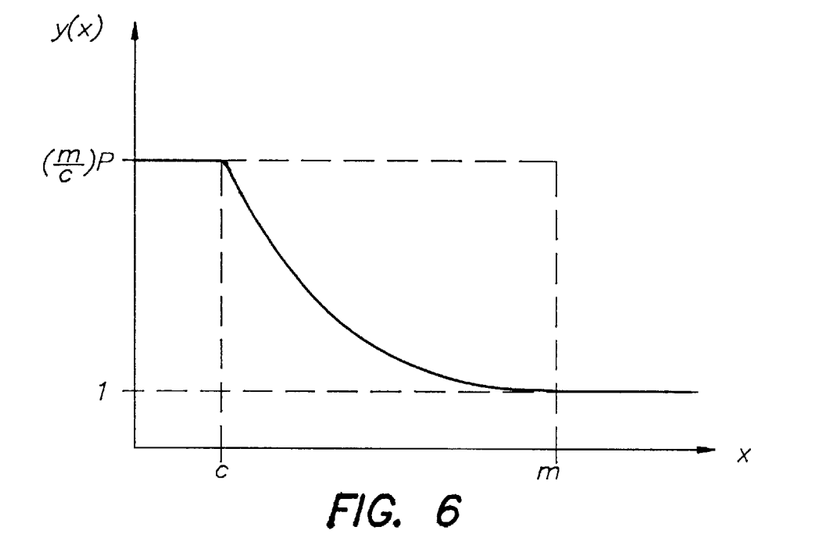
FIG. 6 shows the function y(x)
Figure 7:
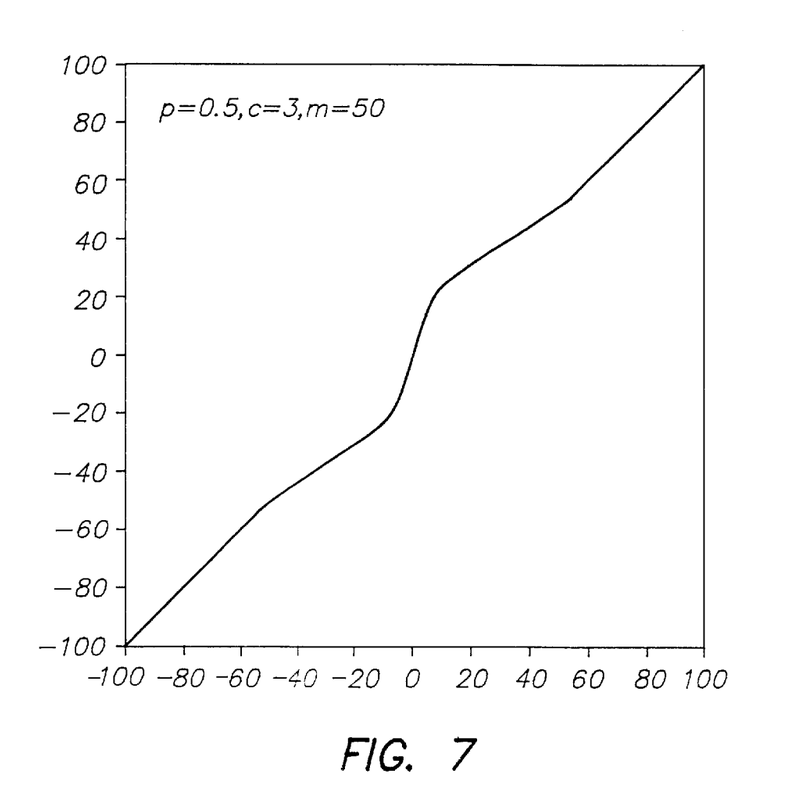
FIG. 7 is an example of a modifying function.

The function y, being shown in FIG. 6, was used to multiply against the transform coefficients. This function is defined as follows $$y(x) = \left(\frac{m}{c}\right)^p \quad \text{if } |x|<c \quad (12)$$

$$y(x) = \left(\frac{m}{|x|}\right)^p \quad \text{if } c \leq |x| \leq m$$

$$y(x) = 1 \quad \text{if } |x| \geq m$$

m is an upper bound for the transform coefficients, transform coefficients larger than m are not modified. The value p, 0<p<1, determines the degree of nonlinearity.

The value c is a cross-over parameter. For values larger than c the modification is nonlinear, for values smaller than c the modification is linear. This is performed in order to prevent unnecessary overenhancement of the noise in the image.

The value of c is therefore preferably related to the noise content of the image, it is preferably equal to the estimated standard deviation of the noise in the image.

The parameter m can be chosen to be level dependent.

The function may additionally depend on the pixel values in he image so that the modification may depend on the image content.

By applying these formulae only colour differences for which differences in all three components are small, are enlarged.

This kind of enlargement always occurs in the direction of He colour difference; i.e. the direction of the colour gradient is never changed only its magnitude is changed.

An enhanced colour image (L', u', v') is obtained by applying the reconstruction algorithm set out higher to the three thus adapted multi-scale gradient pyramidal representations.

By adapting only colour differences, the output range was not controlled. This might have as a consequence that a proper re-scaling of the dynamic range to a predefined range or gamut is required after reconstruction.

Good results are obtained by applying a linear resealing of the L', u', v' values to the original L, u, v range respectively.

It is further possible to bring colours closer to the original colours by applying the following additional mapping procedure after resealing:

For every pixel i:

u'(i) is mapped onto u'(i)+{$\overline{u}-\overline{u'}$} v'(i) is mapped onto v'(i)+{$\overline{v}-\overline{v'}$}

In these formulae the over-bar stands for the mean value of the image over all of its pixels. This mean value can be replaced by a weighted mean over a neighbourhood of the pixel i.

It is further possible to select which parts of the image are enhanced to a larger extent than other parts.

For this purpose for each pixel i the value L(i) is non-linearly mapped prior to the enhancement processing, for example L(i) is mapped onto $\tilde{L}=L(i)^{1-q} 100^q$ prior to the enhancement processing. After this processing the inverse transformation is applied to $\tilde{L}'$. The inverse transform maps $\tilde{L}'(i)$ onto $\tilde{L}'(i)1/1-q\ 100^{-q/1-q}$.

If q>0 a darker part in the image is stretched while a lighter part is compressed. The effect is that the lighter part will be enhanced more than the darker part (as small differences get enlarged by the procedure of the present invention).

If q<0 the darker part will be enhanced more than the lighter part. The enhancement is in this case controlled by our parameters p, c, m and q. Very satisfactory results are obtained for $0.25 \leq p \leq 0.5$.

What is claimed is:

1. A method of enhancing a colour image represented by a set of colour component images in a colour space comprising the steps of
    decomposing at least one of said colour component images into a multi-resolution image representation comprising bandpass detail images at multiple resolution levels and a residual image,
    modifying the multi-resolution image representation of at least one colour component image at at least one resolution level so as to obtain (a) modified multi-resolution image representation(s),
    reconstructing said colour component image(s) by applying a reconstruction algorithm to the residual image and the modified and unmodified bandpass detail images of the respective colour component image(s), said reconstruction algorithm being such that if it were applied to the residual image and unmodified bandpass detail images of a colour component image, the colour component image or an approximation thereof would be obtained.

2. A method according to claim 1 wherein said multi-resolution image representation(s) is/are modified by applying at least one non-linear modifying function to said detail image(s).

3. A method according to claim 2 wherein said multi-resolution image representation(s) is/are modified by multiplying the value of a detail image at pixel i and at resolution level j with a factor which is obtained by evaluating a non-linear modifying function in an argument value which depends on pixel values of detail images of said colour components.

4. A method according to claim 2 wherein said multi-resolution image representation is modified by multiplying the value of a detail image at pixel i and at resolution level j with a factor which is obtained by evaluating a non-linear modifying function in an argument value which depends on pixel values of detail images of said colour components at pixel i and resolution level j.

5. A method according to claim 2 wherein the argument of said non-linear modifying function is the norm of the colour gradient at pixel i and level j.

6. A method according to any of claim 2 wherein said modifying function is defined by $$y(x) = \left(\frac{m}{c}\right)^p \quad \text{if } |x| < c$$

$$y(x) = \left(\frac{m}{|x|}\right)^p \quad \text{if } c \leq |x| \leq m$$

$$y(x) = 1 \quad \text{if } |x| \geq m$$

wherein m is an upper bound value, and wherein the value p, 0<p<1, determines the degree of nonlinearity.

7. A method according to claim 2 wherein said modifying function additionally depends on the pixel value in the original image.

8. A method according to claim 1 wherein said multi-resolution representation comprises directional bandpass detail images.

9. A method according to claim 8 wherein said multi-resolution representation is a multi-resolution gradient representation.

10. A method according to claim 1 wherein said colour component images are defined in a perceptual colour space.

11. A method according to claim 10 wherein said perceptual colour space is the L, u, v colour space.

12. A method according to claim 11 wherein elements of the modified u-component image u'(i) are mapped onto u'(i)+{$\overline{u}-\overline{u'}$} and pixels of the modified v-component image v'(i) are mapped onto v'(i)+{$\overline{v}-\overline{v'}$}.

13. A method according to claim 11 wherein prior to the modification the L component image is non-linearly mapped onto $\tilde{L}$ and wherein $\tilde{L}'$ is inversely mapped after modification.

14. A method according to claim 13 wherein prior to the modification the L component image is mapped onto $\tilde{L}=L(i)^{1-q} 100^q$ whereby $-0.5 \leq q \leq 0.5$ and wherein $\tilde{L}'$ is mapped after modification onto $\tilde{L}'(i)1/1-q\ 100^{q/1-q}$.

15. A method according to claim 1 wherein a gamut is defined, and the colour component images are re-scaled after reconstruction to the defined gamut.

16. A method according to claim 15 wherein said gamut is the gamut of said colour image.

* * * * *